United States Patent
Kwak

(10) Patent No.: US 10,466,761 B2
(45) Date of Patent: Nov. 5, 2019

(54) POWER SYSTEM MONITORING AND CONTROL SYSTEM

(71) Applicant: LSIS CO., LTD., Anyang-si, Gyeonggi-do (KR)

(72) Inventor: Jong Kab Kwak, Yongin-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 210 days.

(21) Appl. No.: 14/690,233

(22) Filed: Apr. 17, 2015

(65) Prior Publication Data
US 2015/0309556 A1  Oct. 29, 2015

(30) Foreign Application Priority Data
Apr. 29, 2014  (KR) .................. 10-2014-0051412

(51) Int. Cl.
G06F 1/32 (2019.01)
G06N 7/06 (2006.01)
G06F 1/3221 (2019.01)
G06F 1/3203 (2019.01)

(52) U.S. Cl.
CPC .......... G06F 1/3221 (2013.01); G06F 1/3203 (2013.01); G06N 7/06 (2013.01)

(58) Field of Classification Search
CPC .............................. G06F 1/3221; G06F 1/3203
See application file for complete search history.

(56) References Cited

U.S. PATENT DOCUMENTS

| | | | |
|---|---|---|---|
| 2005/0137734 A1 | 6/2005 | Nieuwelaar et al. | |
| 2008/0262820 A1* | 10/2008 | Nasle .................... | G06Q 10/04 703/18 |

FOREIGN PATENT DOCUMENTS

| | | |
|---|---|---|
| CN | 101268447 A | 9/2008 |
| CN | 102112940 A | 6/2011 |
| EP | 2037341 | 3/2009 |
| JP | 07-182422 | 7/1995 |
| JP | 2001-357340 | 12/2001 |
| JP | 2005-038098 | 2/2005 |
| JP | 2010-128841 | 6/2010 |
| JP | 2010-198460 | 9/2010 |
| JP | 2011-197714 | 10/2011 |
| KR | 10-2002-0056108 | 7/2002 |
| KR | 10-2009-0032397 | 4/2009 |
| KR | 10-2009-0123051 | 12/2009 |

OTHER PUBLICATIONS

European Patent Office Application Serial No. 15164840.9, Search Report dated Sep. 24, 2015, 11 pages.
Chinese Office Action for related Chinese Application No. 201510277849.8; dated Dec. 4, 2017; (6 pages).

* cited by examiner

*Primary Examiner* — Fahmida Rahman
(74) *Attorney, Agent, or Firm* — K&L Gates LLP

(57) ABSTRACT

A system for monitoring a power system and controlling an operation is provided. The system includes: a process setting unit receiving a process modeling file from a user and setting, as a process setting model, a process modeling file on which process verification is completed; a process verification unit performing the verification of preset process modeling items on the process modeling files received from the user; and a data storage unit storing file information for the operation of a system, the process modeling file, process modeling verification results, and the process setting file.

7 Claims, 5 Drawing Sheets

FIG.3

| PROCESS | EXPLANATION |
|---|---|
| DB_Manager | DB_MANAGER FORMING DB OF SYSTEM AND PROVIDING DB ACCESS METHOD |
| Process_Manager | PROCESS_MANAGER MANAGING STATES OF ALL PROCESSES BEING OPERATED IN SCADA |
| Redundancy_Manager | REDUNDANCY_MANAGER MANAGING REDUNDANCY STATE AND ROLE (ACTIVE/ BACK) OF SYSTEM |
| System_Resource_Manager | SYSTEM_RESOURCE_MANAGER MANAGING SYSTEM RESOURCES (LAN, HDD, CPU, MEMORY, ETC.) |
| Data_Service_Manager | DATA_SERVICE_MANAGER PERFORMING DATA SERVICE BETWEEN CLIENT AND SERVER |
| Alarm_Manager | ALARM_MANAGER MANAGING ALARM ON EVENT, SUCH AS DATA CHANGE, DEVICE FAILURE, ETC. |
| Log_Manager | LOG_MANAGER MANAGING LOG GENERATED BY EACH PROCESS. |
| Synch_Manager | SYNCH_MANAGER MANAGING DATA SYNCHRONIZATION OF REDUNDANT SYSTEM |
| Control_Manager | CONTROL_MANAGER PERFORMING CONTROL COMMAND FROM CLIENT |
| Data_Process_Manager | DATA_PROCESS_MANAGER PROCESSING RAW DATA AND PERFORMING TAG, LIMIT, AND QUALITY HANDLING |
| Calc_Manager | CALC_MANAGER CALCULATING PERIODIC EXPRESSION |
| IO_Manager | IO_MANAGER PERFORMING DATA COMMUNICATION BETWEEN ACTUAL DEVICES |

FIG.4

| PROCESS MODELING ITEMS | | EXPLANATION |
|---|---|---|
| PROCESS NAME | | PROCESS NAME |
| PROCESS PATH | | PATH IN WHICH CORRESPONDING PROCESS RESIDES |
| PROCESS ARGUMENT | | PROCESS EXECUTION PARAMETER |
| PROCESS EXECUTION TIME | | TIME TAKEN UNTIL CORRESPONDING PROCESS IS ACTUALLY EXECUTED |
| STANDBY TIME | | STANDBY TIME UNTIL NEXT PROCESS AFTER EXECUTION OF CORRESPONDING PROCESS IS EXECUTED |
| NUMBER OF RE-OPERATION TIMES | | NUMBER OF RE-EXECUTION TIMES WHEN EXECUTION OF PROCESS IS ABNORMAL |
| PRECEDING PROCESS | | PROCESS TO HAVE TO BE FIRST EXECUTED BEFORE CORRESPONDING PROCESS IS EXECUTED |
| SYSTEM EXECUTION CONDITION | | WHETHER TO FORM DB |
| | | WHETHER TO CHECK ACTIVE HOST |
| | | WHETHER TO RECOVER DATA |
| | | WHETHER TO PERFORM DATA SCAN |
| | | WHETHER TO CALCULATE EXPRESSION ONCE |
| | | AND WHETHER TO PERFORM SYNCHRONIZATION |

POWER SYSTEM MONITORING AND CONTROL SYSTEM

CROSS-REFERENCE TO RELATED APPLICATIONS

Pursuant to 35 U.S.C. § 119(a), this application claims the benefit of earlier filing date and right of priority to Korean Patent Application No. 10-2014-0051412, filed on Apr. 29, 2014, the contents of which are all hereby incorporated by reference herein in its entirety.

BACKGROUND

The present disclosure relates to a power system monitoring and control system, and more particularly, to a system that enables a user to efficiently design a process and to more easily add and delete a process.

A power system monitoring and control system is a system for monitoring and controlling a power system, such as a supervisory control and data acquisition (SCADA) system or energy management system (EMS).

In the power system monitoring and control system, various processes are being performed according to each function and use. These processes may be added or deleted according to a system characteristic, and as the system increases in size and develops, the number of processes will also increase.

FIG. 1 is a block diagram of a typical power system monitoring and control system.

Referring to FIG. 1, a typical power system monitoring and control system 10 includes a process setting unit 11, a data storage unit 12, an input unit 13, a display unit 14, and a communication unit 15.

The typical system 10 sets a process according to a user command input through the input unit 13. The set process is stored as a process setting file in the data storage unit.

There are many types of processes operating in the system 10, which be divided into essential processes and optional processes.

The essential processes are processes necessary for the operation of the system 10. For example, they are fundamental and essential processes of the system, such as database (DB) formation, process monitoring, synchronization and screen services.

The optional processes indicate additional processes for processing and showing data according to user needs.

In the typical system 10, operation processes are generated and set by a user, in which case it is not considered whether the process is an essential process or optional process.

A setting file generated in this way is used when the system operates. When the system operates, the setting file is read and a corresponding process is internally found and executed.

However, the setting of processes by a user in the typical system has many limitations.

Firstly, essential processes may be omitted. The essential processes are necessary for the operation of the system but typically, omission may be recognized only after the process is set and operates. Also, it is not easy to recognize dependency between the processes.

Each of the processes operating in the system has a dependent process and a process that operates only after a preceding process operates.

Typically, a user sets a standby time and executes a process after waiting for the time, in which case the standby time may depend on hardware on which the power system monitoring and control system operates.

SUMMARY

Embodiments provide a system that enables a user to efficiently design a process and to more easily add and deleted a process.

In one embodiment, a system for monitoring a power system and controlling an operation includes: a process setting unit receiving a process modeling file from a user and setting, as a process setting model, a process modeling file on which process verification is completed; a process verification unit performing the verification of preset process modeling items on the process modeling files received from the user; and a data storage unit storing file information for the operation of a system, the process modeling file, process modeling verification results, and the process setting file.

According to embodiments, it is possible to prevent essential processes of the power system monitoring and control system from becoming omitted and recognize dependency between processes so that the power system monitoring and control system operates in various hardware environments.

Also, since it is possible to first recognize limitations that may be caused when the processes of the power system monitoring and control system are added and deleted, the reliability of the system may be enhanced.

The details of one or more embodiments are set forth in the accompanying drawings and the description below. Other features will be apparent from the description and drawings, and from the claims.

BRIEF DESCRIPTION OF THE DRAWINGS

FIG. 3 is a table for explaining the processes defined in the power system monitoring and control system according to an embodiment.

FIG. 4 is a table for explaining the processes and the modeling items for verification defined in the power system monitoring and control system according to an embodiment.

DETAILED DESCRIPTION OF THE EMBODIMENTS

Figure 1:
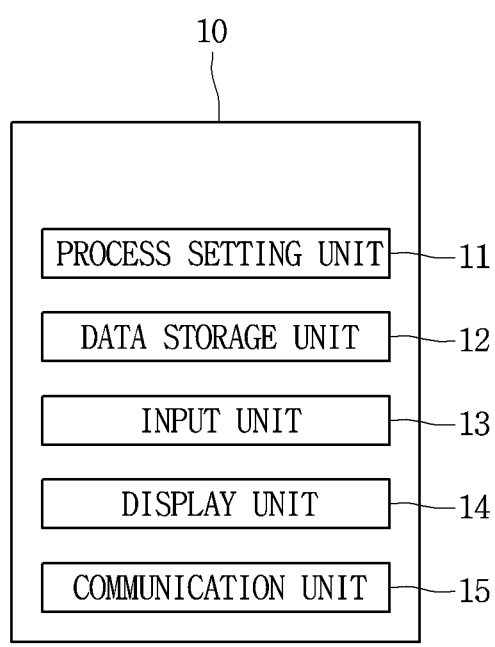
FIG. 1 is a block diagram of a typical power system monitoring and control system.
Figure 2:
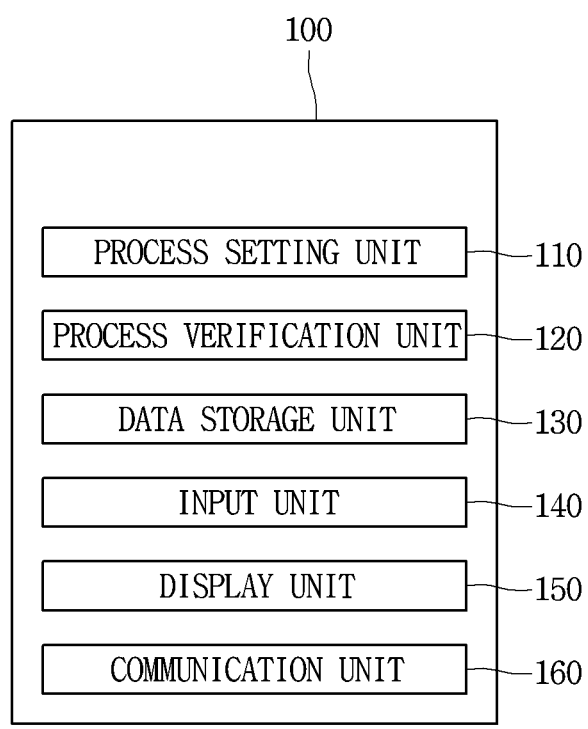
FIG. 2 is a block diagram of a power system monitoring and control system according to an embodiment.

FIG. 2 is a block diagram of a power system monitoring and control system having a process verification function according to an embodiment of the present invention.

Referring to FIG. 2, a power system monitoring and control system 100 having the process verification function according to an embodiment may include a process setting unit 110, a process verification unit 120, a data storage unit 130, an input unit 140, a display unit 150, and a communication unit 160.

The process setting unit 110 receives a process modeling file corresponding to a user input transmitted through the input unit 140.

The process setting unit 110 stores a process modeling file in the data storage unit 130 so that the received process modeling file may be verified. That is, the process setting unit 110 sets, the process modeling file verified through the process verification unit 120, as a process setting file and stores the file in the data storage unit 130.

The process verification unit 120 may read the process modeling file stored in the data storage unit 130 and verify corresponding process modeling files.

In particular, the process verification unit 120 reads the process modeling file, checks, through simulation, the execution time and completion time of each process, and records the times. In addition, it checks through the simulation whether essential processes have been omitted.

In addition, the process verification unit 120 checks the execution time of each process, precondition processes, and whether essential processes have been omitted, and provides a notification to a user.

The user modifies the process modeling file with reference to the information and sets a standby time through the execution time. The standby time ends manually or automatically. In the case of the manual end, a process may be executed by a user input and in the case of the automatic end, the process may be internally executed after execution.

After the setting of the essential processes, optional processes are set. The setting of the optional processes is set in the same way as that of the essential processes, and the process verification unit 120 checks the precondition and execution time of the optional process and provides a notification to a user.

The process verification unit 120 may display process modeling verification results according to verification execution as screen information on the display unit 150, and store the process modeling verification results in the data storage unit 130.

When there is a modification request for the process modeling verification results from the user, the process verification unit 120 may receive a modified process modeling file from a user and re-perform verification. In this example, the modification may include the addition, deletion or change of processes.

The data storage unit 130 may store file information for the operation of the power system monitoring and control system 100, a process modeling file, process modeling verification result information, and a process setting file. The information is stored in the form of a DB. The process modeling file may include various processes.

FIG. 3 is a table for explaining the processes defined in the power system monitoring and control system according to an embodiment.

Referring to FIG. 3, the processes defined in the process modeling file may include processes corresponding respectively to a DB manager DB_Manager, process manger Process_Manager, redundancy manager Redundancy_Manager, system resource manager System_Resource_Manager, data service manager Data_Service_Manager, alarm manager Alarm_Manager, log manager Log_Manager, synchronization manager Synch_Manager, control manager Control_Manager, data process manager Data_Process_Manager, calculation manager Calc_Manager, and input manager IO_Manager.

The DB manager DB_Manager is a process that forms a DB of a system and provides a DB access method.

The process manager Process_Manager is a process that manages the states of all processes being operated in the power system monitoring and control system.

The redundancy manager Redundancy_Manager is a process managing the redundancy state and operation mode of the system.

The system resource manager System_Resource_Manager is a process managing system resources (e.g., LAN, HDD, CPU and memory).

The data service manager Data_Service_Manager is a process performing a data service between a client and a server.

The alarm manager Alarm_Manager is a process managing an alarm on an event, such as a data change, device failure, etc.

The log manager Log_Manager is a process managing a log generated by each process.

The synchronization manager Synch_Manager is a process managing the data synchronization of a redundant system.

The control manager Control_Manager is a process performing a control command from a client.

The data process manager Data_Process_Manager is a process processing raw data and performing tag, limit, and quality handling.

The calculation manager Calc_Manager is a process calculating a periodic expression.

The input manager IO_Manager is a process performing data communication between actual devices.

FIG. 4 is a table for explaining the processes and the modeling items for verification defined in the power system monitoring and control system according to an embodiment.

Referring to FIG. 4, the process modeling items may include a process name, process path, process argument, process execution time, standby time, the number of re-operation times, a preceding process, and a system execution condition.

The process name is an item setting the name of a corresponding process representing each process.

The process path is an item setting a path in which a corresponding process resides.

The process argument is an item setting a process execution parameter set to a corresponding process.

The process execution time is an item setting a time taken until a corresponding process is actually executed.

The standby time is an item setting a standby time until the next process after the execution of a corresponding process is executed.

The number of re-operation times is an item setting the number of re-execution times when the execution of a process is abnormal.

The preceding process is an item setting a process to have to be executed before a corresponding process is executed.

The system execution condition is an item setting conditions, such as whether to form a DB, whether to check an active host, whether to recover data, whether to perform data scan, whether to calculate an expression once, and whether to perform synchronization.

In this case, the process name, process path, process argument, process execution time, standby time, number of re-operation times and preceding process are items that each process has.

The system execution condition is an item needing to be defined only once when modeling verification is performed.

Figure 5:
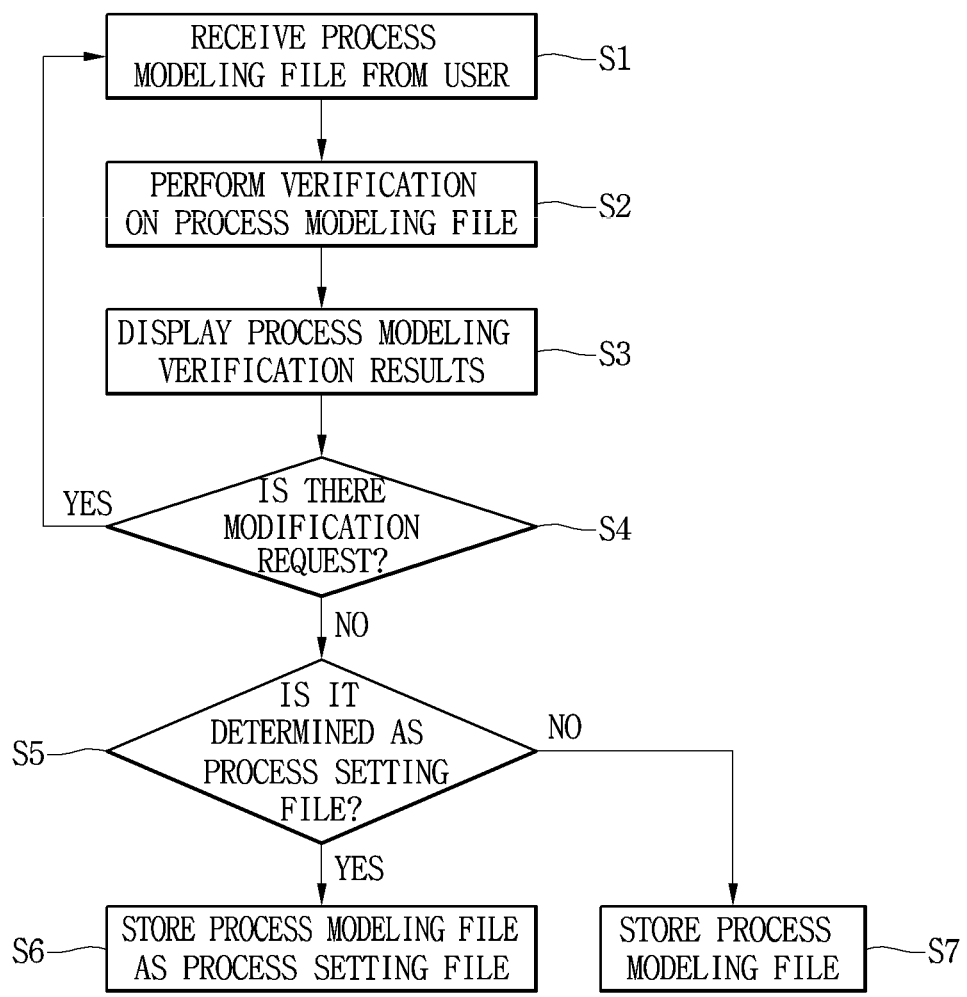
FIG. 5 is a flowchart of a method of performing process verification in the power system monitoring and control system according to an embodiment.

FIG. 5 is a flowchart of a method of performing process verification in the power system monitoring and control system having a process verification function according to an embodiment.

Referring to FIG. 5, the input unit 140 receives a process modeling file from a user in step S1. The received process modeling file is stored in the data storage unit 130.

In this case, the received process modeling file may be a modeling file of any one of the processes in FIG. 3. In a corresponding modeling file, any value is set to each modeling item in FIG. 4 according to a user input.

The process verification unit 120 reads the process modeling file stored in the data storage unit 130 and verifies corresponding process modeling files in step S2.

The process verification unit 120 performs verification on each process modeling file, in which the process verification unit performs verification on a corresponding process modeling file with reference to a setting for the modeling item set to the corresponding process modeling file For, the process verification unit 120 may read the process modeling file, check through simulation the execution time and completion time of each process, and record the times. Also, it is possible to check through simulation whether essential processes have been omitted. The process verification unit 120 may check the execution time of each process, precondition processes, and whether essential processes have been omitted.

The process verification unit 120 displays, process modeling verification results obtained by performing verification, on the display unit 150 in step S3. In this case, the process verification unit 120 stores the process modeling verification results in the storage unit 130.

A user may modify the process modeling file with reference to the process modeling verification results and set a standby time through the execution time. The standby time ends manually or automatically. In the case of the manual end, a process may be executed by a user input and in the case of the automatic end, the process may be internally executed after execution.

The process verification unit 120 determines whether there is a modification request for a corresponding process modeling file from a user in step S4, while the process modeling verification results are displayed on the display unit 150.

When there is the modification request, a series of procedures are performed. That is, the process modeling file is received back from the user in step S1, verification on a corresponding process modeling file is performed in step S2, and process modeling verification results are displayed in step S3.

When there is no modification request from the user, the process verification unit 120 calls the process setting unit 110 to enable the next procedure to be performed.

The process setting unit 110 determines whether there is, from a user, an input that determines a corresponding process modeling file as a process setting file, in step S5.

When there is, from the user, the input that determines a corresponding process modeling file as a process setting file, the corresponding process modeling file is stored as the process setting file in the data storage unit 130.

When there is, from the user, no input that determines a corresponding process modeling file as a process setting file, the corresponding process modeling file is stored in the data storage unit 130 and process verification and process setting are completed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A system for monitoring a power system and controlling an operation of the power system, the system comprising:
    an input unit configured to input a process modeling file, wherein the process modeling file includes at least one of essential processes necessary for operation of the system or optional processes optionally used for the operation of the system;
    a data storage unit configured to store file information for operating the system;
    a central processing unit implementing:
        a process verification unit configured to perform verification of preset process modeling items on the process modeling file stored in the data storage unit and to cause storing of a verification result in the data storage unit, wherein the verification is performed through a preset simulation to check whether an essential process included in the process modeling file has been omitted; and
        a process setting unit configured to set the process modeling file received from the input unit as a process setting file based on the stored verification result; and
    a display unit configured to display the verification result, wherein the process setting unit is further configured to:
        receive the process modeling file inputted from the input unit;
        determine whether there is an input that determines the process modeling file as the process setting file;
        cause storing of the process modeling file in the data storage unit such that the process modeling file is verified by the process verification unit;
        set the process modeling file as the process setting file based on the verification result stored in the data storage unit in response to the input determining the process modeling file as the process setting file; and
        cause storing of the process setting file in the data storage unit, the process modeling file stored in the data storage unit when it is determined that there is no input determining the process modeling file as the process setting file,
    wherein the process verification unit recognizes execution time and completion time of each process included in the process modeling file through preset simulation to perform the verification,
    wherein the input unit is further configured to modify the process modeling file according to the verification result displayed on the display unit by setting a standby time of the process modeling file through the execution time of each process recognized by the process verification unit.

2. The system according to claim 1, wherein the process verification unit is further configured to check execution time of each process included the process modeling file and precondition processes to perform the verification.

3. The system according to claim 1, wherein the process verification unit is further configured to re-perform process verification on a modified process modeling file transmitted from the input unit.

4. The system according to claim 1, wherein processes defined in the process modeling file comprise one or more of processes corresponding to at least one of a database (DB) manager, process manager, redundancy manager, system resource manager, data service manager, alarm manager, log manager, synchronization manager, control manager, data process manager, calculation manager, or an input driver.

5. The system according to claim 1, wherein the process modeling items comprise at least one of a process name, process path, process argument, process execution time, standby time, a number of re-operation times, a preceding process, or a system execution condition.

6. The system according to claim 5, wherein the system execution condition is an item for setting one or more of conditions on at least one of whether to form a database (DB), whether to check an active host, whether to recover data, whether to perform a data scan, whether to calculate an expression once, or whether to perform synchronization.

7. The system according to claim 1, wherein the process setting unit is further configured to cause storing of the process modeling file in the data storage unit when the input is not received from the input unit.

\* \* \* \* \*